US006490150B1

(12) United States Patent
Theisen et al.

(10) Patent No.: US 6,490,150 B1
(45) Date of Patent: Dec. 3, 2002

(54) METHOD OF ELECTRICALLY GROUNDING A CIRCUIT BREAKER AND CIRCUIT BREAKER PANEL EMPLOYING A GROUNDING MEMBER

(75) Inventors: Peter J. Theisen, West Bend, WI (US); James Michael McCormick, Bradenton, FL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/038,244

(22) Filed: Oct. 29, 2001

(51) Int. Cl.[7] .................................................. H02B 1/04

(52) U.S. Cl. ........................ 361/673; 361/634; 361/652; 174/51; 200/296

(58) Field of Search ................................. 361/628, 632, 361/634, 635, 644, 647, 652, 656, 673; 174/51; 200/296

(56) References Cited

U.S. PATENT DOCUMENTS 4,039,235 A 8/1977 Thibeault
4,342,979 A * 8/1982 Phillips ....................... 337/41
4,496,791 A * 1/1985 Reichert et al. .............. 174/51
4,639,054 A * 1/1987 Kersbergen ................. 200/292
4,695,923 A * 9/1987 Abraham .................... 361/648
5,107,237 A * 4/1992 Peterson ..................... 335/170
5,527,991 A 6/1996 Sadowski et al.
5,967,837 A * 10/1999 Wolfe et al. ................ 439/550
6,066,817 A * 5/2000 Flegel ........................ 200/296
6,313,403 B1 * 11/2001 Livingston et al. ........... 174/51

* cited by examiner

*Primary Examiner*—Gerald Tolin
(74) *Attorney, Agent, or Firm*—Marvin L. Union

(57) ABSTRACT

A circuit breaker panel includes a panel having a surface; an electrically conductive grounding member, such as a grounding strip, adapted for electrical connection to ground; a circuit breaker having an electrically conductive surface; and one or more fasteners fastening the circuit breaker to the panel. The electrically conductive grounding member is sandwiched between the surface of the panel and the electrically conductive surface of the circuit breaker. The electrically conductive circuit breaker surface electrically engages the electrically conductive grounding member.

25 Claims, 4 Drawing Sheets

METHOD OF ELECTRICALLY GROUNDING A CIRCUIT BREAKER AND CIRCUIT BREAKER PANEL EMPLOYING A GROUNDING MEMBER

CROSS-REFERENCE TO RELATED APPLICATIONS

This application is related to commonly assigned, co-pending U.S. patent application Ser. No. 09/845,519, filed Apr. 30, 2001, entitled "Circuit Breaker"; and application Ser. No. 09/506,871, filed Feb. 15, 2000, entitled "Circuit Breaker With Instantaneous Trip Provided By Main Conductor Routed Through Magnetic Circuit Of Electronic Trip Motor".

BACKGROUND OF THE INVENTION

1. Field of the Invention

This invention relates to panels for electrical switching apparatus and, more particularly, to panels for circuit breakers, such as, for example, aircraft circuit breakers. The invention also relates to methods of electrically grounding electrical switching apparatus, such as circuit breakers.

2. Background Information

Circuit breakers are used to protect electrical circuitry from damage due to an overcurrent condition, such as an overload condition or a relatively high level short circuit or fault condition between a power source (e.g., a line terminal) and a load.

Subminiature circuit breakers are used, for example, in aircraft electrical systems where they not only provide overcurrent protection but also serve as switches for turning equipment on and off. As such, they are subjected to heavy use and, therefore, must be capable of performing reliably over many operating cycles. They also must be small to accommodate the high-density layout of circuit breaker panels, which make circuit breakers for numerous circuits accessible to a user. Aircraft electrical systems usually consist of hundreds of circuit breakers, each of which is used for a circuit protection function as well as a circuit disconnection function through a push-pull handle.

Typically, subminiature circuit breakers have only provided protection against persistent overcurrents implemented by a latch triggered by a bimetal responsive to $I^2R$ heating resulting from the overcurrent. There is a growing interest in providing additional protection, and most importantly arc fault protection. Arc faults are typically high impedance faults and can be intermittent. Nevertheless, such arc faults can result in a fire.

Many non-aircraft circuit breakers employ ground fault protection. In aircraft applications, the aircraft frame is ground, and there is no neutral conductor. Some aircraft systems have also provided ground fault protection, but through the use of additional devices, namely current transformers which in some cases are remotely located from the protective relay.

Typically, aircraft circuit breaker panels are, at best, poor conductors (e.g., such panels are painted; are made of a non-conductive composite material; or are made of an oxidized conductive material, such as aluminum).

In order to monitor faults, such as arc faults in aircraft circuit breakers, there exists the need to power arc fault detection circuitry. Hence, there exists the need to provide a reliable ground connection to the aircraft circuit breaker in addition to the existing line terminal from the power source.

U.S. Pat. No. 5,527,991 discloses a U-shaped metal grounding strap for a panel-mounted electrical switch. The grounding strap includes two legs having serrated segments, which scrape the edges of an opening in the panel in order to remove any paint or non-conductive coating on the panel.

U.S. Pat. No. 4,039,235 discloses a grounding strip for an electrical receptacle. The grounding strip includes an extension having screw-engaging means underlying an opening in the mounting ears of the receptacle. Metal screws, in turn, provide a self-grounded connection through the screw-engaging means to a grounded wall box.

There is room for improvement in circuit breaker panels and methods of electrically grounding circuit breakers.

SUMMARY OF THE INVENTION

The present invention employs an electrically conductive grounding member, such as a grounding strip which is adapted for electrical connection to ground, proximate the surface of a circuit breaker panel. A circuit breaker has an electrically conductive surface, which electrically engages the electrically conductive grounding member.

According to one aspect of the invention, a method of electrically grounding a circuit breaker comprises: employing a panel having a surface; grounding an electrically conductive grounding member; employing a circuit breaker having an electrically conductive surface; employing the electrically conductive grounding member between the surface of the panel and the electrically conductive surface of the circuit breaker; mounting the circuit breaker to the panel; and electrically engaging the electrically conductive grounding member with the electrically conductive surface of the circuit breaker.

A circuit breaker may be employed having a bezel and a pair of mounting holes; a first opening may be employed in the panel corresponding to the bezel of the circuit breaker and a pair of second openings may be employed in the panel corresponding to the mounting holes of the circuit breaker. The bezel of the circuit breaker may be passed through the first opening in the panel. The circuit breaker may be fastened to the panel with a pair of fasteners, which engage the panel at the second openings thereof and the circuit breaker at the mounting holes thereof.

The pair of second openings may be employed in the panel on opposite sides of the first opening thereof. A first opening may be employed in the electrically conductive grounding member corresponding to the bezel of the circuit breaker and a pair of second openings may be employed in the electrically conductive grounding member on opposite sides of the first opening thereof. The bezel may be passed through the first opening of the electrically conductive grounding member.

The electrically conductive grounding member may be a silver-plated copper strip.

Preferably, the electrically conductive surface of the circuit breaker is a mounting plate having a raised surface, and the electrically conductive grounding member is electrically engaged with the raised surface of the mounting plate. Preferably, the electrically conductive grounding member is sandwiched between the panel and the mounting plate of the circuit breaker, thereby electrically engaging the electrically conductive raised surface of the circuit breaker with the electrically conductive grounding member.

The circuit breaker may have a bezel with an electrically conductive engagement surface as the electrically conductive surface of the circuit breaker, and the electrically conductive grounding member may be electrically engaged with the electrically conductive engagement surface.

Preferably, the electrically conductive grounding member is sandwiched between the panel and the electrically conductive engagement surface, thereby electrically engaging the electrically conductive surface of the circuit breaker with the electrically conductive grounding member.

As another aspect of the invention, a circuit breaker panel comprises: a panel having a surface; an electrically conductive grounding member adapted for electrical connection to ground; a circuit breaker having an electrically conductive surface; and at least one fastener fastening the circuit breaker to the panel, with the electrically conductive grounding member between the surface of the panel and the electrically conductive surface of the circuit breaker, and with the electrically conductive surface of the circuit breaker electrically engaging the electrically conductive grounding member.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a subminiature circuit breaker panel for use in aircraft alternating current (AC) systems, which are typically 400 Hz, but can also be used in direct current (DC) systems. It will also become evident that the invention is applicable to other types of circuit breaker panels including those used in AC systems operating at other frequencies; to larger circuit breakers, such as miniature residential or commercial circuit breakers; and to a wide range of circuit breaker applications, such as, for example, residential, commercial, industrial, aerospace, and automotive. As further non-limiting examples, both AC (e.g., 120, 220, 480–600 VAC) operation at a wide range of frequencies (e.g., 50, 60, 120, 400 Hz) and DC operation (e.g., 42 VDC) are possible.

Figure 1:
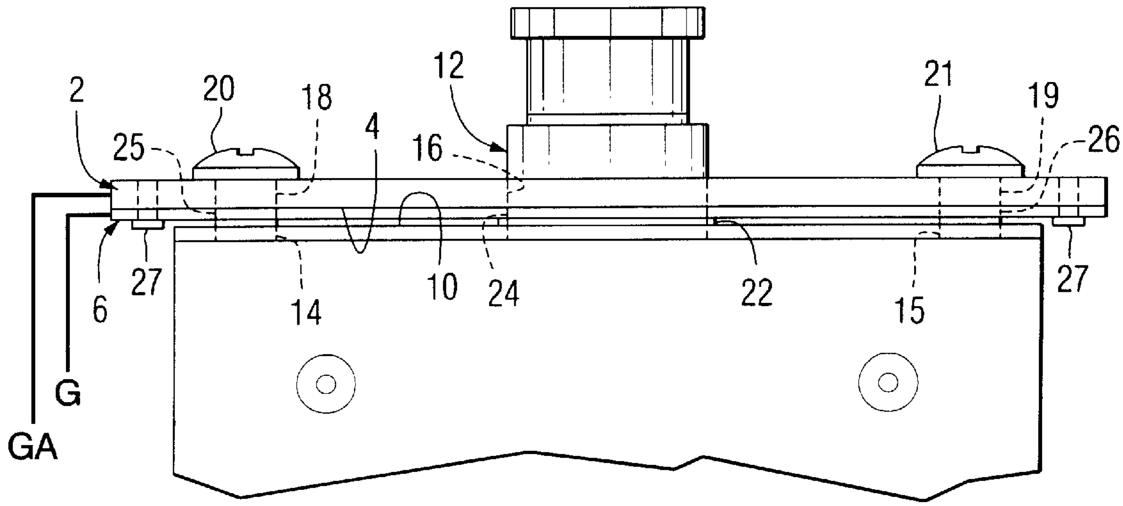
FIG. 1 is an elevational view of a circuit breaker, grounding strip and circuit breaker mounting panel in accordance with an embodiment of the invention.
Figure 2:
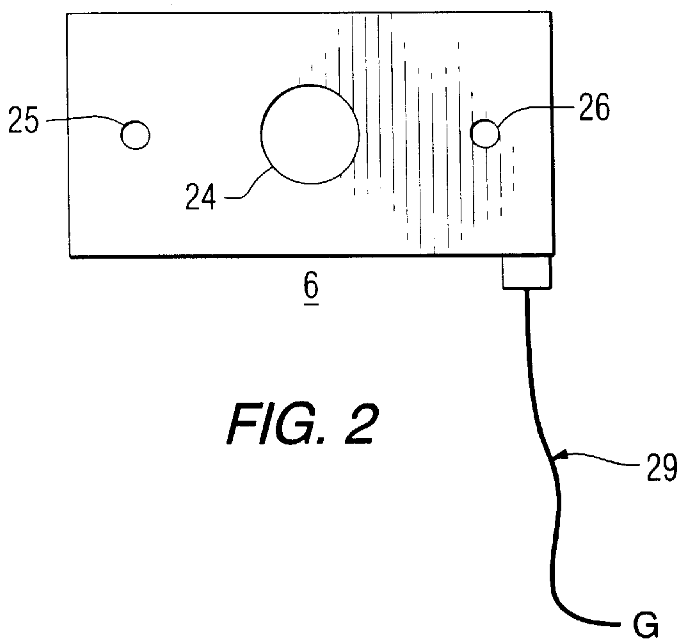
FIG. 2 is a plan view of the grounding strip of FIG. 1.
Figure 3:
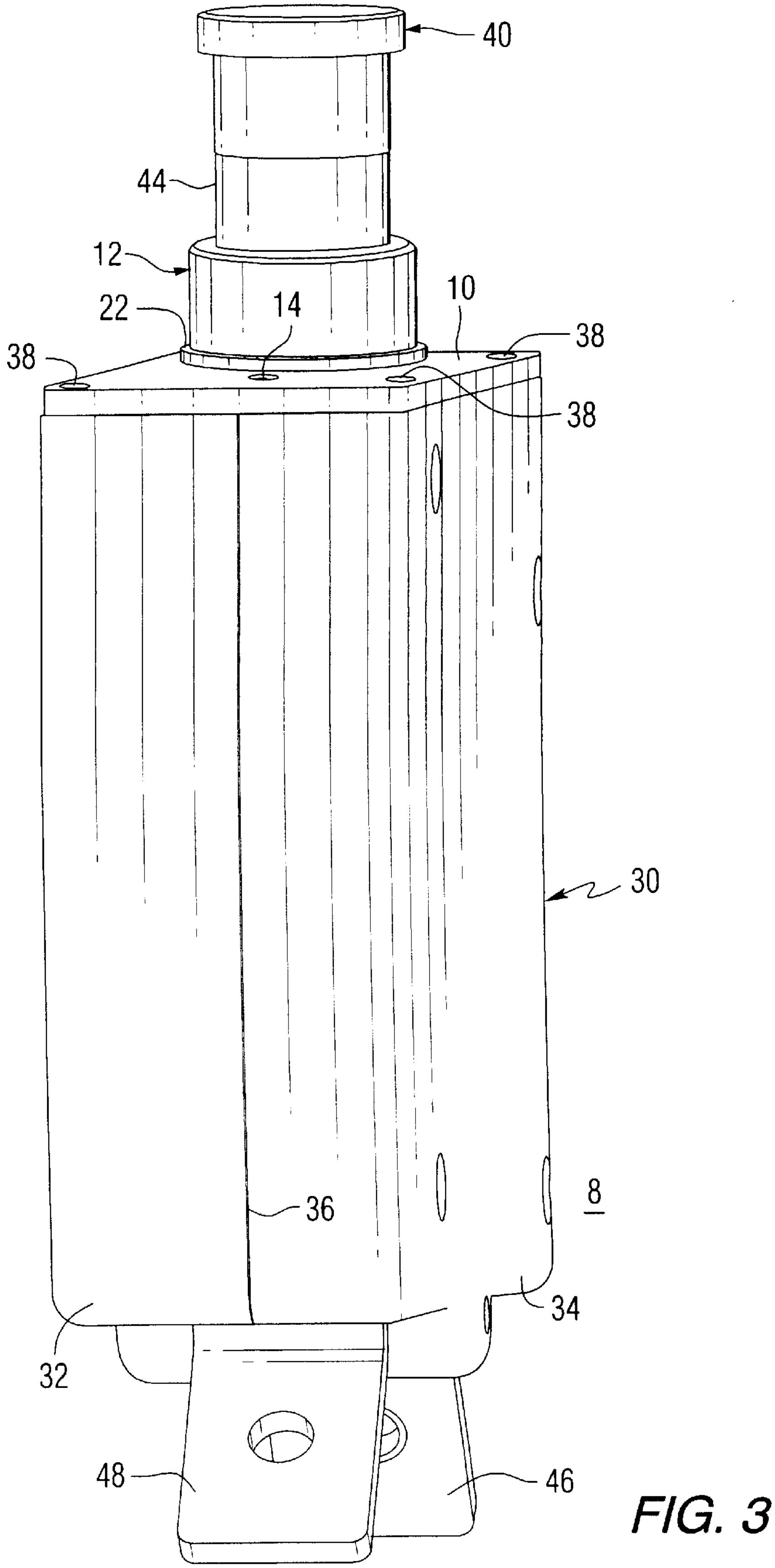
FIG. 3 is an isometric view of the circuit breaker of FIG. 1.

Referring to FIGS. 1–3, a method of electrically grounding a circuit breaker includes employing an aircraft circuit breaker panel 2 having a surface 4; grounding (G) an electrically conductive grounding member 6; employing a circuit breaker, such as the exemplary aircraft circuit breaker 8 having an electrically conductive surface or mounting plate 10; employing the electrically conductive grounding member 6 between the panel surface 4 and the electrically conductive circuit breaker surface 10; mounting the circuit breaker 8 to the panel 2; and electrically engaging the electrically conductive grounding member 6 with the electrically conductive circuit breaker surface 10. Preferably, the grounding member 6 is sandwiched between the panel 2 and the circuit breaker surface 10.

In the exemplary embodiment of FIGS. 1–3, the grounding member 6 is a silver-plated copper strip, which is suitably adapted for electrical connection to ground (e.g., by a wiring connection to the aircraft frame (not shown)). The grounding member 6 is preferably made of a robust electrically conductive material under a wide range of conditions (e.g., copper, a suitable copper alloy, aluminum, or a suitable aluminum alloy any of which is plated with a suitable electrical conductor, such as, for example, silver, tin, silver and tin, or gold).

The exemplary circuit breaker 8 has a bezel 12 and a pair of mounting holes 14,15 in the mounting surface 10. The mounting panel 2 has a first opening 16 25 corresponding to the circuit breaker bezel 12, and a pair of second openings 18,19 corresponding to the circuit breaker threaded mounting holes 14,15, respectively. As shown in FIG. 1, the circuit breaker bezel 12 passes through the first panel opening 16. Two exemplary fasteners, such as screws 20,21, engage the panel 2 at the second openings 18,19 thereof and engage the circuit breaker 8 at the threaded mounting holes 14,15 thereof and, thus, fasten the circuit breaker 8 to the panel 2. In this configuration, the electrically conductive circuit breaker mounting surface 10 electrically engages the electrically conductive grounding member 6. Preferably, the electrically conductive upper surface 10 of the circuit breaker 8 is a brass mounting plate having a silver-plated raised ridge 22, which electrically engages the exemplary silver-plated copper strip 6.

As shown in FIG. 2, the electrically conductive grounding member 6 has a first opening 24 corresponding to the circuit breaker bezel 12 and a pair of second openings 25,26 on opposite sides of the first opening 24 thereof. The circuit breaker bezel 12 passes through the first opening 24 of the electrically conductive grounding member 6 and the first opening 16 of the panel 2. In accordance with a preferred practice of the present invention, the electrically conductive grounding member 6 is sandwiched in between the panel 2 and the circuit breaker mounting plate 10, thereby electrically engaging the electrically conductive raised surface 22 of the circuit breaker 8 with the electrically conductive grounding member 6.

The holes 24,25,26 of the grounding member 6 preferably mimic the corresponding holes 16,18,19, respectively, of the mounting panel 2. Preferably, the grounding member 6 is suitably thin (e.g., about 0.020 in. thick in the exemplary embodiment), is placed under the mounting panel 2, and is suitably mechanically attached (e.g., by a screw or rivet 27) to the lower surface 4 of the mounting panel 2.

In the exemplary embodiment, the mounting plate 10 is preferably made of a suitable copper alloy (e.g., brass), copper, a suitable aluminum alloy, or aluminum having a suitably plated (e.g., plated with a robust electrically conductive material under a wide range of conditions, such as, for example, silver, tin, silver and tin, gold) and suitably raised surface 22 (e.g., a ring raised about 0.020 in. above the mounting plate 10 for suitably electrically engaging the silver-plated copper grounding strip 6). The exemplary silver-plated raised surface 22 of the brass mounting plate 10 electrically engages the silver-plated copper grounding strip 6, which is suitably grounded (e.g., by a ground conductor and screw thread terminal 29 to the aircraft frame (not shown); by a ground conductor which is electrically connected to a suitable terminal, such as a box lug (not shown)), and which is sandwiched between the aircraft mounting panel 2 and the circuit breaker 8. This brings the silver-plated raised surface 22 of the circuit breaker 8 into electrical engagement with the silver-plated copper grounding strip 6.

The panel 2 may be left ungrounded or may be electrically connected to ground through a suitable electrical connection, such as GA.

As shown in FIG. 3, the exemplary circuit breaker 8 includes a housing 30 formed by two sections 32,34 molded of an insulative resin which are joined along a mating plane 36 to form an enclosure from confronting cavities (not shown). The circuit breaker housing 30 preferably has the brass mounting plate 10 secured thereto by four fasteners, such as screws 38, at the four corners thereof. In the exemplary circuit breaker 8, a handle member 40 having an indicator sleeve 44 is supported for reciprocal linear movement by the bezel 12, which is seated in the end in the mounting plate 10. The bezel 12 protrudes beyond the silver-plated raised surface 22 of the mounting plate 10. The exemplary circuit breaker 8 also includes a line terminal 46 and load terminal 48 supported in the bottom of the molded housing 30 and having cantilevered sections extending outside of the housing for connection to line and load conductors, respectively (not shown).

Figure 4:
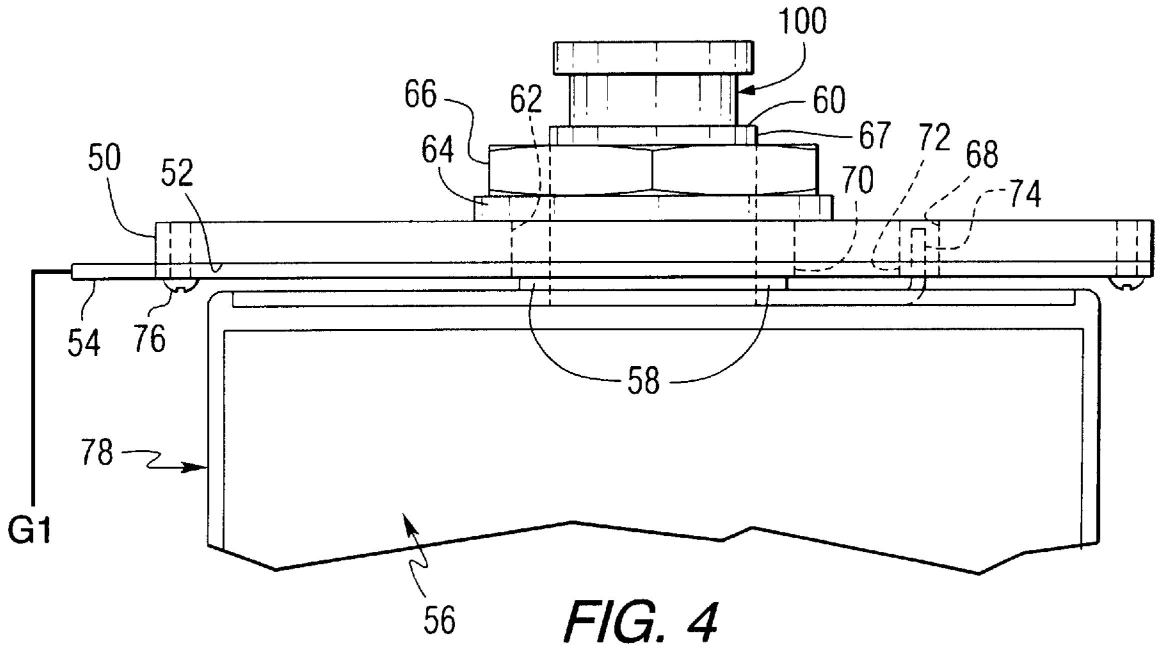
FIG. 4 is an elevational view of a circuit breaker, grounding strip and circuit breaker mounting panel in accordance with another embodiment of the invention.
Figure 5:
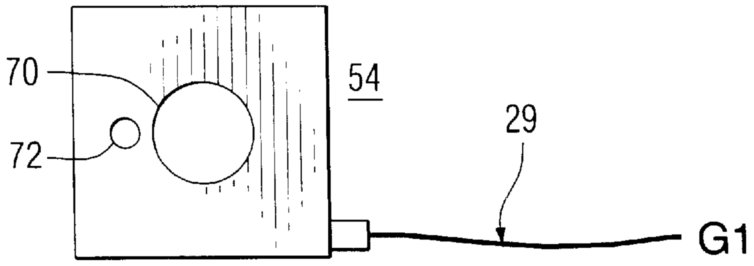
FIG. 5 is a plan view of the grounding strip of FIG. 4.
Figure 6:
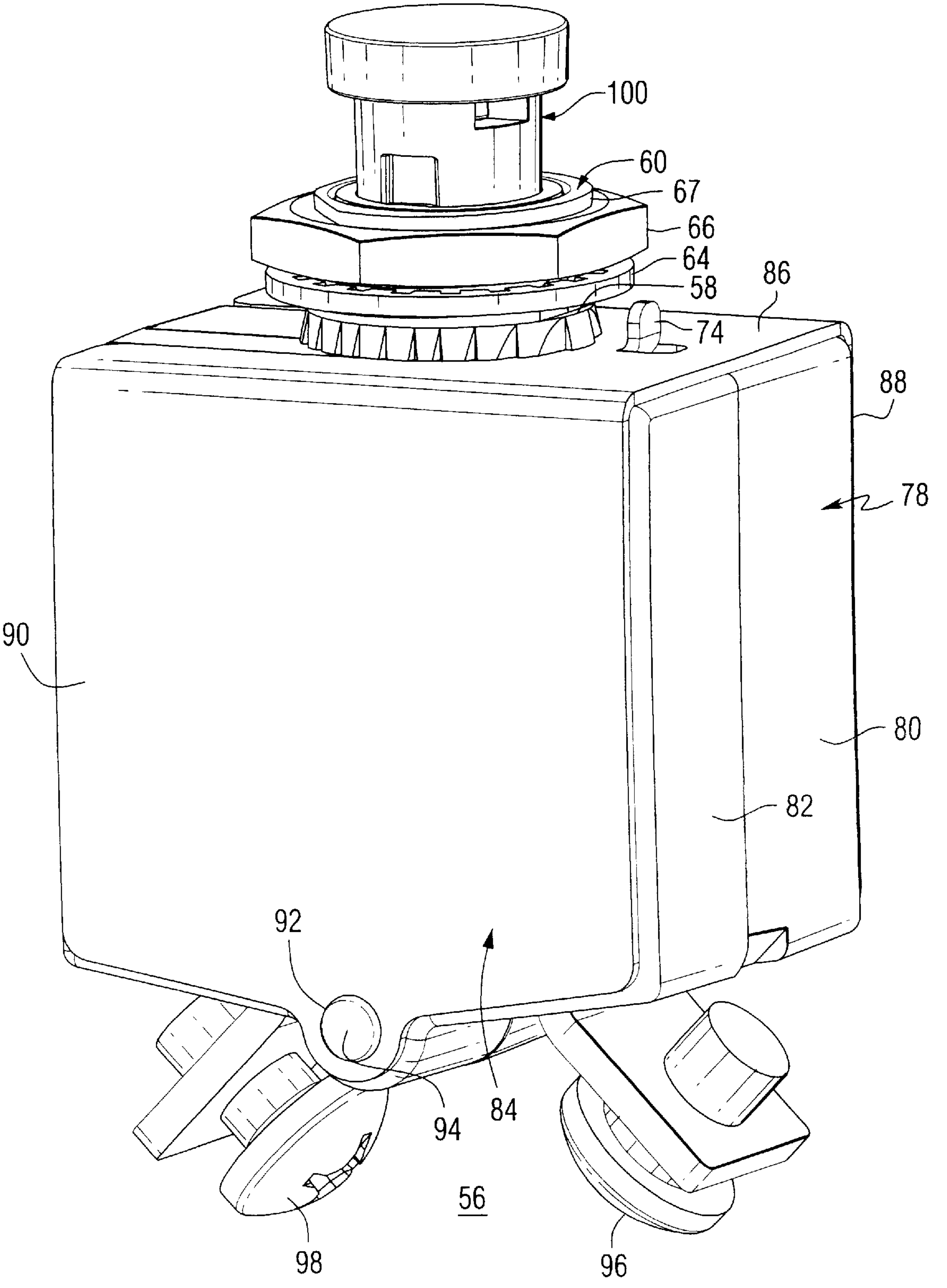
FIG. 6 is an isometric view of the circuit breaker of FIG. 4.

Referring to FIGS. 4–6, a method of electrically grounding a circuit breaker includes employing an aircraft circuit breaker panel 50 having a surface 52; grounding (G1) an electrically conductive grounding member 54; employing a circuit breaker, such as the exemplary aircraft circuit breaker 56 having an electrically conductive surface 58 on an exemplary bezel 60; employing the electrically conductive grounding member 54 between the panel surface 52 and the electrically conductive circuit breaker surface 58; mounting the circuit breaker 56 to the panel 50; and electrically engaging the electrically conductive grounding member 54 with the electrically conductive circuit breaker surface 58. Preferably, the grounding member 54 is sandwiched between the panel 50 and the circuit breaker surface 58.

Preferably, the electrically conductive grounding member 54 is a silver-plated copper grounding strip, the bezel 60 is preferably made of copper, and the electrically conductive surface 58 is a silver-plated copper surface.

The exemplary panel 50 has an opening 62 corresponding to the circuit breaker bezel 60, which passes through that opening 62. In turn, a suitable fastener, such as a lock washer 64 and nut 66, are employed on a threaded portion 67 of the bezel 60 to secure the circuit breaker 56 to the panel 50.

As shown in FIG. 4, the electrically conductive surface 58 is on the bezel 60, and the silver-plated copper strip 54 is sandwiched between the panel 50 and the surface 58, thereby electrically engaging the electrically conductive raised surface 58 with the silver-plated copper strip 54. The grounding member 54 is preferably made of a robust electrically conductive material under a wide range of conditions (e.g., copper, a suitable copper alloy, aluminum, or a suitable aluminum alloy any of which is plated with a suitable electrical conductor such as, for example, silver, tin, silver and tin, or gold).

The panel 50 also has a second opening 68 proximate the first opening 62. The electrically conductive grounding member 54 has a first opening 70 corresponding to the bezel 60 and a second opening 72 proximate the first opening 70 thereof. The bezel 60 passes through the first opening 70 of the electrically conductive grounding member 54 and the first panel opening 62. The circuit breaker 56 has a raised portion or stop 74 proximate the bezel 60. The stop 74 passes through the second opening 72 of the electrically conductive grounding member 54 and the second panel opening 68, thereby preventing rotation of the mounted circuit breaker 56 when installed in the panel 50.

The silver-plated copper grounding strip 54 is sandwiched between the panel 50 and the electrically conductive engagement surface 58, thereby electrically engaging the exemplary silver-plated electrically conductive circuit breaker engagement surface 58 of the brass bezel 60 with the strip 54.

The holes 70,72 of the grounding member 54 preferably mimic the corresponding holes 62,68, respectively, of the mounting panel 50. Preferably, the grounding member 54 is suitably thin (e.g., about 0.020 in. thick in the exemplary embodiment), is placed under the mounting panel 50, and is suitably mechanically attached (e.g., by a screw or rivet 76) to the lower surface 52 of the mounting panel 50.

In the exemplary embodiment, the bezel 60 is preferably made of a suitable copper alloy (e.g., brass), copper, a suitable aluminum alloy, or aluminum having a suitably plated (e.g., plated with a robust electrically conductive material under a wide range of conditions, such as silver, tin, silver and tin, gold) and suitably raised surface 58 (e.g., a ring raised about, for example, 0.020 in. above the top surface 86). The raised surface 58 electrically engages the silver-plated copper grounding strip 54, which is suitably grounded (e.g., by a conductor and screw thread terminal 29; by a conductor which is electrically connected to a suitable terminal, such as a box lug (not shown)), and which is sandwiched between the aircraft mounting panel 50 and the circuit breaker 56. When the mounting nut 66 is tightened, the silver-plated engagement surface 58 suitably electrically engages the silver-plated copper grounding strip 54.

As shown in FIG. 6, the exemplary circuit breaker 56 has a housing 78 formed by two sections 80,82 molded of an insulative resin which sections are joined along a mating plane to form an enclosure from confronting cavities (not shown). The circuit breaker 56 can include an external clip plate 84 having a top 86 and two sides 88,90 disposed therefrom. The clip plate side 88 captures the section or molded case 80 and the other clip plate side 90 captures the other section or molded cover 82. Each of the molded sections 80,82 and the corresponding clip plate sides 88,90 has an opening, such as 92 of the side 90, therethrough. A fastener, such as a rivet 94, is disposed through those openings, such as 92, in order to draw the one side 88 toward the other side 90 and, thereby, secure the molded sections 80,82. The circuit breaker 56 also includes a line terminal 96, a load terminal 98, and an operating handle assembly 100, which protrudes through an opening in the bezel 60.

The exemplary circuit breakers 8 and 56 provide a highly reliable grounding connection between the silver-plated raised ridge 22 of the brass mounting plate 10 and the silver-plated copper grounding strip 6 of FIGS. 1–3, and between the silver-plated electrically conductive copper surface 58 of the brass bezel 60 and the silver-plated copper grounding strip 54 of FIGS. 4–6, respectively. The exemplary silver-plated copper grounding strips 6,54 are advantageously placed on the underside of the respective circuit breaker mounting panels 2,50. The grounding strips 6,54 are separately connected to the airframe ground/neutral, thereby providing a reliable ground connection (e.g., a ground connection that does not involve a connection to an aluminum circuit breaker panel surface) for the exemplary circuit breaker arc fault power supply (not shown) or other internal circuit breaker power supply or circuit.

The exemplary grounding strips 6,54 are relatively thin and are sandwiched between the circuit breaker and the mounting panel. Hence, they add no significant space to the circuit breaker panel. Furthermore, these grounding strips are easily retrofitted into an existing installation.

Although exemplary grounding strips 6,54 are shown for individual circuit breakers, a relatively larger grounding strip may be employed for two, three or many circuit breakers as configured on a mounting panel.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of electrically grounding a circuit breaker, said method comprising the steps of:

employing a panel having a surface;

grounding an electrically conductive grounding member;

employing a circuit breaker having an electrically conductive surface;

employing the electrically conductive grounding member between the surface of the panel and the electrically conductive surface of said circuit breaker;

mounting the circuit breaker to the panel; and electrically engaging the electrically conductive grounding member with the electrically conductive surface of the circuit breaker.

2. The method of claim 1 further comprising employing an aircraft circuit breaker as said circuit breaker.

3. The method of claim 1 further comprising employing an alternating current circuit breaker as said circuit breaker.

4. The method of claim 1 further comprising employing a circuit breaker having a bezel and a pair of mounting holes;

employing a first opening in the panel corresponding to the bezel of the circuit breaker and a pair of second openings in the panel corresponding to the mounting holes of the circuit breaker;

passing the bezel of the circuit breaker through the first opening in the panel; and fastening the circuit breaker to the panel with a pair of fasteners, which engage the panel at the second openings thereof and the circuit breaker at the mounting holes thereof.

5. The method of claim 4 further comprising employing screws as said fasteners.

6. The method of claim 4 further comprising employing the pair of second openings in the panel on opposite sides of the first opening thereof;

employing a first opening in the electrically conductive grounding member corresponding to the bezel of the circuit breaker and a pair of second openings in the electrically conductive grounding member on opposite sides of the first opening thereof; and passing the bezel through the first opening of the electrically conductive grounding member.

7. The method of claim 1 further comprising grounding the panel.

8. The method of claim 1 further comprising attaching the electrically conductive grounding member to the surface of the panel.

9. The method of claim 1 further comprising employing as said electrically conductive grounding member a silver-plated copper strip.

10. The method of claim 1 further comprising employing as the electrically conductive surface of the circuit breaker a mounting member having a raised surface; and electrically engaging said electrically conductive grounding member with the raised surface of the mounting member.

11. The method of claim 10 further comprising sandwiching the electrically conductive grounding member between the panel and the mounting member of the circuit breaker, thereby electrically engaging the electrically conductive raised surface of the circuit breaker with the electrically conductive grounding member.

12. The method of claim 10 further comprising employing a brass mounting member;

plating the brass mounting member with silver;

employing a copper grounding strip as said electrically conductive grounding member;

plating the copper grounding strip with silver; and electrically engaging the silver-plated raised surface of the brass mounting member with the silver-plated copper grounding strip.

13. The method of claim 1 further comprising employing said circuit breaker with a bezel;

employing an opening in the panel corresponding to the bezel of the circuit breaker;

passing the bezel of the circuit breaker through the opening in the panel; and fastening the bezel of the circuit breaker to the panel with a fastener.

14. The method of claim 13 further comprising employing a nut and a lock washer as said fastener.

15. The method of claim 13 further comprising employing a first opening in the panel as the opening in the panel corresponding to the bezel of the circuit breaker, and a second opening in the panel proximate the first opening thereof;

employing a first opening in the electrically conductive grounding member corresponding to the bezel of the circuit breaker and a second opening proximate the first opening thereof;

passing the bezel through the first opening of the electrically conductive grounding member;

employing a stop proximate the bezel of the circuit breaker; and passing the stop through the second opening of the electrically conductive grounding member and the second opening of the panel.

16. The method of claim 1 further comprising employing with said circuit breaker a bezel having an electrically conductive engagement surface as the electrically conductive surface of the circuit breaker; and electrically engaging said electrically conductive grounding member with said electrically conductive engagement surface.

17. The method of claim 16 further comprising sandwiching the electrically conductive grounding member between the panel and said electrically conductive engagement surface, thereby electrically engaging the electrically conductive surface of the circuit breaker with the electrically conductive grounding member.

18. The method of claim 16 further comprising employing a brass bezel as the bezel of said circuit breaker;

silver plating the electrically conductive engagement surface of said brass bezel;

employing a copper grounding strip as said electrically conductive grounding member;

silver plating the copper grounding strip; and electrically engaging the silver-plated electrically conductive engagement surface of the brass bezel with the silver-plated copper grounding strip.

19. A circuit breaker panel comprising:

a panel having a surface;

an electrically conductive grounding member adapted for electrical connection to ground;

a circuit breaker having an electrically conductive surface; and at least one fastener fastening the circuit breaker to the panel, with the electrically conductive grounding member between the surface of the panel and the electrically conductive surface of said circuit breaker, and with the electrically conductive surface of said circuit breaker electrically engaging said electrically conductive grounding member.

20. The circuit breaker panel of claim 19 wherein said circuit breaker has a bezel and a pair of mounting holes; wherein said panel has a first opening corresponding to the bezel of said circuit breaker and a pair of second openings corresponding to the mounting holes of said circuit breaker; wherein the bezel of said circuit breaker passes through the first opening in said panel; and wherein said at least one fastener is a pair of fasteners, which engage the panel at the second openings thereof and the circuit breaker at the mounting holes thereof.

21. The circuit breaker panel of claim 20 wherein the second openings of said panel are on opposite sides of the first opening; wherein said electrically conductive grounding member has a first opening corresponding to the bezel of the circuit breaker and a pair of second openings on opposite sides of the first opening thereof; and wherein the bezel of said circuit breaker passes through the first opening of said electrically conductive grounding member and the first opening of said panel.

22. The circuit breaker panel of claim 19 wherein said electrically conductive grounding member is a silver-plated copper strip; wherein the electrically conductive surface of said circuit breaker is a mounting plate having a raised surface; and wherein the said silver-plated copper strip is sandwiched between said panel and the mounting plate of said circuit breaker, thereby electrically engaging the electrically conductive raised surface of the mounting plate of said circuit breaker with said silver-plated copper strip.

23. The circuit breaker panel of claim 19 wherein said circuit breaker has a bezel; wherein said panel has an opening corresponding to the bezel of said circuit breaker; wherein the bezel of said circuit breaker passes through the opening in said panel; and wherein said at least one fastener is a fastener fastening the bezel of said circuit breaker to said panel.

24. The circuit breaker panel of claim 19 wherein said circuit breaker has a bezel with an electrically conductive engagement surface, which is the electrically conductive surface of said circuit breaker; wherein said panel has a first opening corresponding to the bezel of said circuit breaker and a second opening proximate the first opening; wherein said electrically conductive grounding member has a first opening corresponding to the bezel of said circuit breaker and a second opening proximate the first opening thereof; wherein the bezel passes through the first opening of said electrically conductive grounding member and the first opening of said panel; wherein the circuit breaker further has a stop proximate the bezel of said circuit breaker; and wherein the stop passes through the second opening of said electrically conductive grounding member and the second opening of said panel.

25. The circuit breaker panel of claim 19 wherein said circuit breaker has a bezel with an electrically conductive engagement surface, which is the electrically conductive surface of said circuit breaker; and wherein said electrically conductive grounding member is sandwiched between said panel and said electrically conductive engagement surface, thereby electrically engaging the electrically conductive engagement surface of the bezel of said circuit breaker with the electrically conductive grounding member.

* * * * *